US012135761B2

(12) United States Patent
Weisel et al.

(10) Patent No.: US 12,135,761 B2
(45) Date of Patent: Nov. 5, 2024

(54) APPLYING A CONVOLUTION KERNEL ON INPUT DATA

(71) Applicant: Mobileye Vision Technologies Ltd., Jerusalem (IL)

(72) Inventors: Orly Weisel, Efrat (IL); Yaniv Fais, Tel Aviv (IL); Arik Gaon, Shomrat (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 377 days.

(21) Appl. No.: 17/565,673

(22) Filed: Dec. 30, 2021

(65) Prior Publication Data

US 2022/0222317 A1 Jul. 14, 2022

Related U.S. Application Data

(60) Provisional application No. 63/135,302, filed on Jan. 8, 2021.

(51) Int. Cl.
*G06F 17/15* (2006.01)
*B60W 60/00* (2020.01)
(Continued)

(52) U.S. Cl.
CPC ......... *G06F 17/153* (2013.01); *B60W 60/001* (2020.02); *G06N 3/04* (2013.01); *G06V 10/454* (2022.01)

(58) Field of Classification Search
CPC ...... B60W 60/001; G06F 17/153; G06N 3/04; G06N 3/045; G06V 10/454; G06V 10/82; G06V 20/58

See application file for complete search history.

(56) References Cited

U.S. PATENT DOCUMENTS

2018/0232508 A1* 8/2018 Kursun ................. G06N 3/045
2018/0300964 A1* 10/2018 Lakshamanan ........ G06N 3/044
(Continued)

OTHER PUBLICATIONS

Zengshuai Qiu, "Outdoor Semantic Segmentation for UGVs Based on CNN and Fully Connected CRFs," May 6, 2019, IEEE Sensors Journal, vol. 19, No. 11, Jun. 1, 2019, pp. 4290-4294.*
(Continued)

*Primary Examiner* — Omar S Ismail
(74) *Attorney, Agent, or Firm* — Schwegman Lundberg & Woessner, P.A.

(57) ABSTRACT

An improved convolution kernel system and method may be used to improve performance of analysis of input image data for autonomous or semi-autonomous vehicle navigation. A processing circuit may be used to apply a convolution kernel on the input data to provide output data that comprises output data segments. The application may include repeating scanning and summing, including parallel scanning input data segments of the different input channels and of the input data depth value to provide first intermediate results associated with the input data depth value, and summing first intermediate results associated with a same output data channel and with different input depth values to provide, per each output data channel, a second result. The output analyzed image data may be used to generate a vehicle control signal, such as automatic control of braking, acceleration, or steering of a vehicle.

17 Claims, 6 Drawing Sheets

(51) Int. Cl.
 *G06N 3/04* (2023.01)
 *G06V 10/44* (2022.01)

(56) References Cited

U.S. PATENT DOCUMENTS

| | | | |
|---|---|---|---|
| 2019/0043201 A1* | 2/2019 | Strong | G06V 10/96 |
| 2019/0206090 A1* | 7/2019 | Ray | G06T 9/002 |
| 2019/0258920 A1* | 8/2019 | Lie | G06F 9/324 |
| 2020/0134833 A1* | 4/2020 | Biswas | G06N 5/046 |
| 2020/0242381 A1* | 7/2020 | Chao | B60W 60/001 |
| 2021/0073995 A1* | 3/2021 | Yang | G06N 3/045 |
| 2021/0213973 A1* | 7/2021 | Carillo Pena et al. | G06N 3/044 |
| 2021/0357688 A1* | 11/2021 | Kearney | G06F 18/214 |
| 2021/0358137 A1* | 11/2021 | Lee | G06N 3/045 |
| 2021/0358296 A1* | 11/2021 | Lee | G06T 7/246 |
| 2021/0374502 A1* | 12/2021 | Roth | G06N 3/08 |
| 2022/0027672 A1* | 1/2022 | Xu | G06N 3/084 |
| 2022/0058466 A1* | 2/2022 | Yang | G06N 3/08 |

OTHER PUBLICATIONS

Yu Huang,"Autonomous Driving with Deep Learning: A Survey of State-of-Art Technologies,"Jul. 4, 2020,arXiv preprint arXiv: 2006.06091 (2020),pp. 1-18.*

Hironobu Fujiyoshi, "Deep learning-based image recognition for autonomous driving,"Dec. 6, 2019,IATSS Research 43 (2019), pp. 245-250.*

Ying Li,"Deep Learning for LiDAR Point Clouds in Autonomous Driving: A Review,"Aug. 4, 2021,IEEE Transactions On Neural Networks and Learning Systems, vol. 32, No. 8, Aug. 2021,pp. 3412-3425.*

Qi Chen, "F-Cooper: Feature based Cooperative Perception for Autonomous Vehicle Edge Computing System Using 3D Point Clouds,"Nov. 7, 2019,SEC '19: Proceedings of the 4th ACM/IEEE Symposium on Edge Computing Nov. 2019,pp. 88-93.*

* cited by examiner

APPLYING A CONVOLUTION KERNEL ON INPUT DATA

PRIORITY

This application claims the benefit of priority to U.S. Provisional Patent Application Ser. No. 63/135,302, filed Jan. 8, 2021, which is incorporated by reference herein in its entirety.

BACKGROUND

Advanced driver assistance systems (ADAS) and autonomous vehicle (AV) systems use cameras and other sensors together with object classifiers to detect specific objects in an environment of a vehicle navigating a road. Object classifiers are designed to detect predefined objects and are used within ADAS and AV systems, and may be used to control the vehicle or alert a driver based on the detected object type or object location. As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation, autonomous driving, or driver assist technology features. As opposed to fully autonomous driving, driver assist technology may refer to any suitable technology to assist drivers in the navigation or control of their vehicles. Examples of driver assist technology include Forward Collision Warning (FCW), Lane Departure Warning (LDW), Traffic Sign Recognition (TSR), and other driver assist technologies. In various embodiments, the system may include one, two, or more cameras mountable in a vehicle and an associated processor that monitors the environment of the vehicle. In further embodiments, additional types of sensors can be mounted in the vehicle and can be used in the autonomous navigation or driver assist systems. In some examples of the presently disclosed subject matter, the system may provide techniques for processing images of an environment in advance of a vehicle navigating a road, where the processing including training neural networks or deep learning algorithms to estimate a future path of a vehicle based on images. In yet further examples of the presently disclosed subject matter, the system may provide techniques for processing images of an environment in advance of a vehicle navigating a road using a trained neural network to estimate a future path of the vehicle.

There are provided systems and methods, as illustrated in the claims and the specification. Any combination of any subject matter of any claim may be provided. Any combination of any method or method step disclosed in any figure or in the specification may be provided. Any combination of any unit, device, or component disclosed in any figure or in the specification may be provided. Non-limiting examples of such units include a gather unit, an image processor, and the like.

BRIEF DESCRIPTION OF THE DRAWINGS

The subject matter regarded as the subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the subject matter. However, it will be understood by those skilled in the art that the present subject matter may be practiced without these specific details. In other instances, well-known methods, procedures, and components have not been described in detail so as not to obscure the present subject matter.

The subject matter regarded as the subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present subject matter may, for the most part, be implemented using electronic components and circuits known to those skilled in the art, details will not be explained in any greater extent than that considered necessary as illustrated above, for the understanding and appreciation of the underlying concepts of the present subject matter and in order not to obfuscate or distract from the teachings of the present subject matter.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method or method steps executed by the image processor, or there may be provided a method or method steps executed by the image processor.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, or any part of the specification or any claims may be provided. Particularly, any combination of any claimed feature may be provided.

Before discussing examples in detail, such as examples of features of the processing images of an environment in advance of a vehicle navigating a road for training a neural networks or deep learning algorithms to estimate a future path of a vehicle based on images or feature of the processing of images of an environment in advance of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data or from data that is not image-based or is not exclusively image-based.

Figure 1:
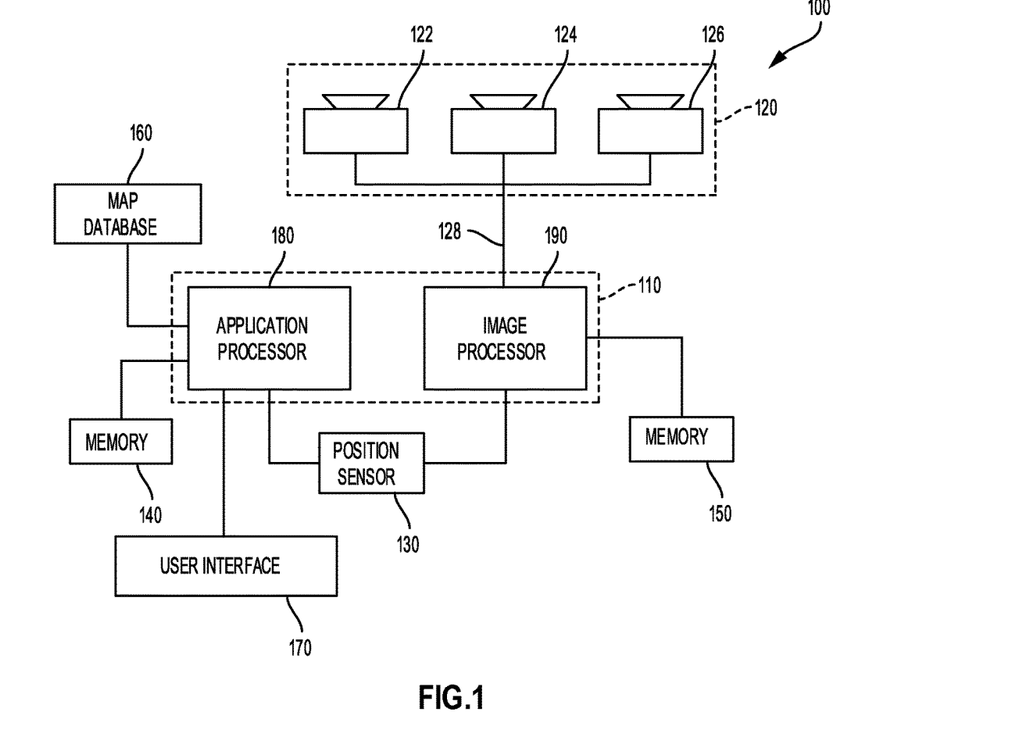
FIG. 1 is a block diagram representation of a system consistent with the disclosed embodiments.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition system 120, and one or more memory units 140, 150. Processing unit 110 can include one or more processing devices. In some embodiments, processing unit 110 can include an application processor 180, an image processor 190, or any other suitable processing device. Similarly, image acquisition system 120 can include any number of image acquisition devices and components depending on the requirements of a particular application. In some embodiments, image acquisition system 120 can include one or more image capture devices (e.g., cameras), such as image capture device 122, image capture device 124, and image capture device 126. In some embodiments, system 100 can also include a data interface 128 communicatively connecting processing unit 110 to image acquisition system 120. For example, data interface 128 can include any wired or wireless link or links for transmitting image data acquired by image acquisition system 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 or image processor 190 can include any type of single or multi-core processor, mobile device microcontroller, central processing unit, or other type of processor. Various processing devices can be used, for example including processors available from manufacturers (e.g., Intel®, AMD®, etc.), and can include various architectures (e.g., x86 processor, ARM®, etc.).

In some embodiments, application processor 180 or image processor 190 can include any of the EyeQ series of processor chips available from Mobileye®. These processor designs each include multiple processing units with local memory and instruction sets. Such processors may include video inputs for receiving image data from multiple image sensors, and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, the DMA, the second MIPS34K CPU, the multi-channel DMA, and the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random-access memories (RAM), read only memories (ROM), flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 or image processor 190), can control operation of various aspects of system 100. These memory units can include various databases and image processing software. The memory units can include random access memory, read only memory, flash memory, disk drives, optical storage, tape storage, removable storage, or any other types of storage. In some examples, memory units 140, 150 can be separate from the application processor 180 or image processor 190. In other embodiments, these memory units can be integrated into application processor 180 or image processor 190.

In some embodiments, the system can include a position sensor 130. The position sensor 130 can include any type of device suitable for determining a location associated with at least one component of system 100. In some embodiments, position sensor 130 can include a global positioning system (GPS) receiver. Such receivers can determine a user position and velocity by processing signals broadcasted by GPS satellites. Position information from position sensor 130 can be made available to application processor 180 or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include a throttling system, a braking system, and a steering system (e.g., throttling system 220, braking system 230, and steering system 240 of FIG. 2E).

In some embodiments, the system 100 can include a user interface 170. User interface 170 can include any device suitable for providing information to or for receiving inputs from one or more users of system 100, for example including a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, for example including names and other information associated with any of the stored features. For example, the database may include locations and types of known obstacles, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such remote embodiments, information from map database 160 can be downloaded over a wired or wireless data connection to a network (e.g., over a cellular network or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, four, or more image capture devices. Image capture devices 122, 124, and 126 will be further described with reference to FIGS. 2B-2E, below.

It would be appreciated that the system 100 can include or can be operatively associated with other types of sensors, for example including an acoustic sensor, a radio frequency (RF) sensor (e.g., radar transceiver), a LIDAR sensor, or other sensors. Such sensors can be used independently of or in cooperation with the image acquisition system 120. For example, data from a radar system (not shown) can be used for validating the processed information that is received from processing images acquired by the image acquisition system 120, such as to filter certain false positives resulting from processing images acquired by the image acquisition system 120. Data from a radar system can also be combined with or otherwise compliment the image data from the image acquisition system 120, or be combined with some processed variation or derivative of the image data from the image acquisition system 120.

Figure 2A:
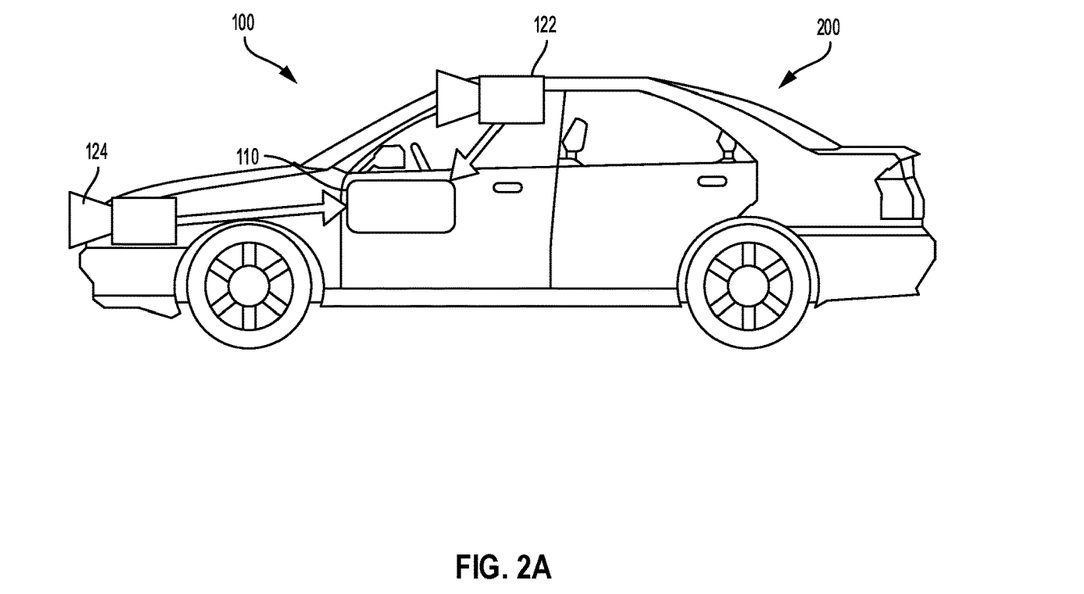
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments, vehicle 200 can be equipped with only a single-image capture device (e.g., camera), in other embodiments multiple image capture devices can be used, such as those discussed in connection with FIGS. 2B-2E, multiple image capture devices can be used. For example, either of image capture devices 122 or 124 of vehicle 200, as shown in FIG. 2A, can be part of an ADAS (Advanced Driver Assistance Systems) imaging set.

The image capture devices included on vehicle 200 as part of the image acquisition system 120 can be positioned at any suitable location. In some embodiments, as shown in FIGS. 2A-2E and 3, image capture device 122 can be located in the vicinity of the rearview mirror (e.g., mirror 310 of FIG. 3). This position may provide a line of sight similar to that of the driver of vehicle 200, which can aid in determining what is and is not visible to the driver.

Other locations for the image capture devices of image acquisition system 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near vehicle lights on the front or back of vehicle 200, or in other locations. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition system 120 can extend beyond the FOV of a typical driver and can thus image objects which are outside the FOV of the driver. In yet another example, the FOV of the image acquisition system 120 is some portion of the FOV of the driver. In some embodiments, the FOV of the image acquisition system 120 corresponding to a sector which covers an area of a road in advance of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle 200. Vehicle 200 may also be equipped with a position sensor 130, such as a GPS receiver and may also include a map database 160 and memory units 140 and 150.

Figure 2B:
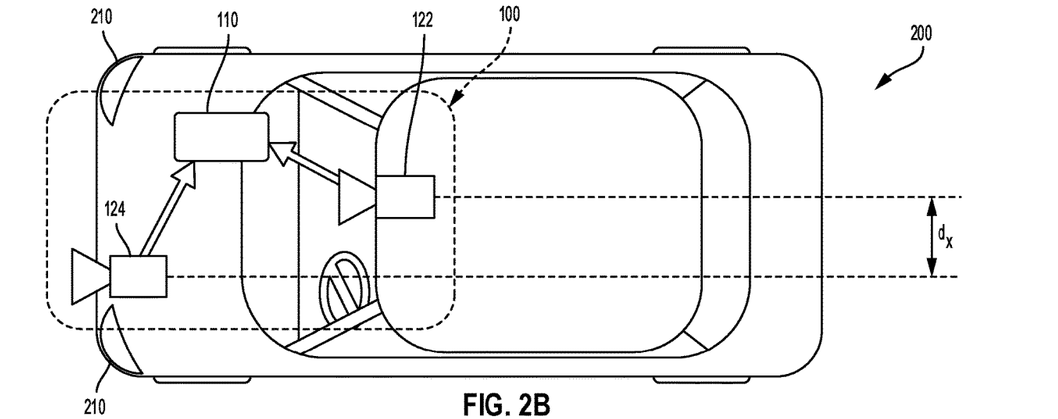
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a system 100 within a vehicle 200. The system 100 may include a first image capture device 122 positioned in the vicinity of the rearview mirror or near the driver of vehicle 200, a second image capture device 124 positioned on or in a bumper region (e.g., one of bumper regions 210) of vehicle 200, and a processing unit 110.

Figure 2C:
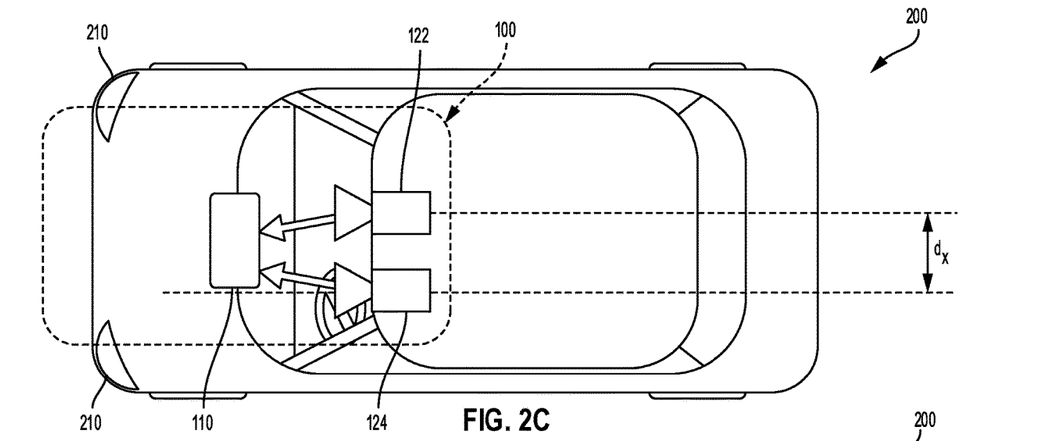
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror or near the driver of vehicle 120. Additionally, while two image capture devices 122 and 124 are shown in FIGS. 2B and 2C, it should be understood that other embodiments may include more than two image capture devices. For example, in the embodiment shown in FIG. 2D, system 100 includes a first image capture device 122, a second image capture device 124, and a third image capture device 126.

Figure 2D:
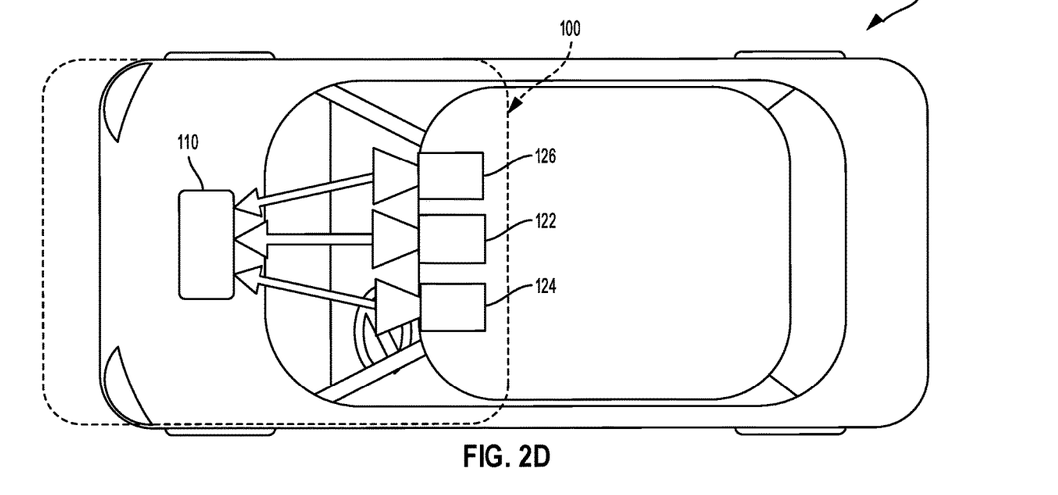
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror or near the driver seat of vehicle 200. The disclosed examples are not limited to any particular number and configuration of the image capture devices, and the image capture devices may be positioned in any appropriate location within or on vehicle 200. It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition system 120, and any image capture device which is implemented as part of the image acquisition system 120, can have any desired image resolution. For example, image capture device 122 can provide a resolution of 1280×960 pixels and can include a rolling shutter. As used herein, a pixel may include a picture element obtained by a camera, or may include a processed picture element.

Image acquisition system 120, and any image capture device that is implemented as part of the image acquisition system 120, can include various optical elements. In some embodiments, one or more lenses can be included, such as to provide a desired focal length and field of view for the image acquisition system 120. These lenses may be used for any image capture device that is implemented as part of the image acquisition system 120. In some examples, an image capture device that is implemented as part of the image acquisition system 120 can include or can be associated with any optical elements, such as a 6 mm lens or a 12 mm lens. In some examples, image capture device 122 can be configured to capture images having a desired and known FOV.

The first image capture device 122 may have a scan rate associated with acquisition of each of the first series of image scan lines. The scan rate may refer to a rate at which an image sensor can acquire image data associated with each pixel included in a particular scan line.

Figure 2E:
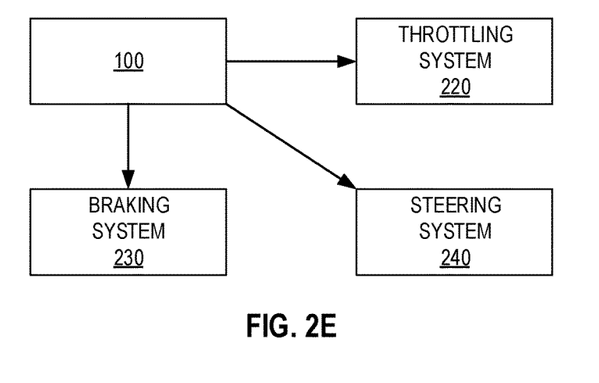
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired or wireless link or links for transmitting data). For example, based on analysis of images acquired by image capture devices 122, 124, or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking or turning, etc.).

Figure 3:
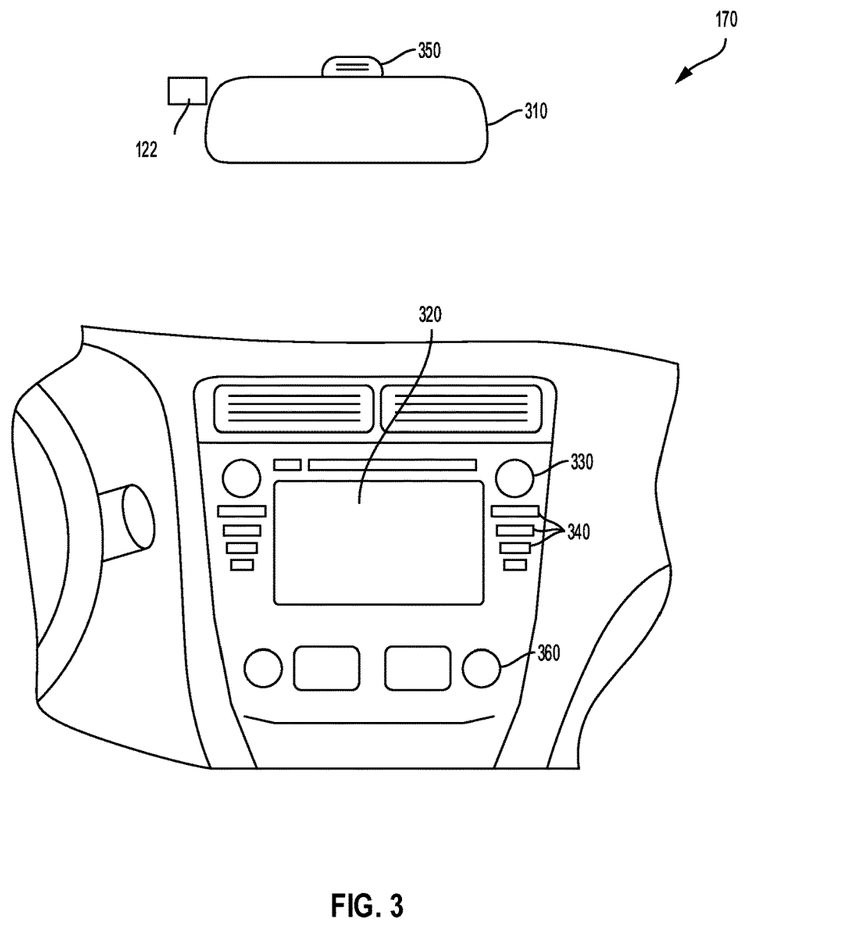
FIG. 3 is a diagrammatic representation of a user interface consistent with the disclosed embodiments.

FIG. 3 is a diagrammatic representation of a user interface 170 consistent with the disclosed embodiments. As shown in FIG. 3, vehicle 200 may also include a user interface 170 for interacting with a driver or a passenger of vehicle 200. The user interface 170 may include one or more sensors positioned near a rear-view mirror 310 or a console display 320. For example, user interface 170 in a vehicle application may include a touch screen display 320, knobs 330, buttons 340, and a microphone 350. A driver or passenger of vehicle 200 may also use handles (e.g., turn signal handles located on or near the steering column of vehicle 200), buttons (e.g., located on the steering wheel of vehicle 200), and the like, to interact with system 100. In some embodiments, a microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate or otherwise control or operate vehicle 200. Navigation, control, or operation of vehicle 200 may include enabling or disabling (directly or via intermediary controllers, such as the controllers mentioned above) various features, components, devices, modes, systems, or subsystems associated with vehicle 200. Navigation, control, or operation may alternately or additionally include interaction with a user, driver, passenger, passerby, or other vehicle or user, which may be located inside or outside vehicle 200, for example by providing visual, audio, haptic, or other sensory alerts or indications.

As discussed below in further detail and consistent with various disclosed embodiments, system 100 may provide a variety of features related to autonomous driving, semi-autonomous driving or driver assist technology. For example, system 100 may analyze image data, position data (e.g., GPS location information), map data, speed data, or data from sensors included in vehicle 200. System 100 may collect the data for analysis from, for example, image acquisition system 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, or steering of vehicle 200 (e.g., by sending control signals to one or more of throttling system 220, braking system 230, and steering system 124). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

In deep learning, a convolution neural network (CNN, or ConvNet) is a class of deep neural networks, most commonly applied to analyzing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

A convolution neural network includes an input layer, an output layer, as well as multiple hidden layers. The hidden layers of a CNN typically include a series of convolution layers that convolve with a multiplication or other dot product. The activation function is commonly a RELU layer, and is subsequently followed by additional convolutions such as pooling layers, fully connected layers and normalization layers, referred to as hidden layers because their inputs and outputs are masked by the activation function and final convolution. The final convolution, in turn, often involves backpropagation in order to more accurately weight the end product.

Though the layers are colloquially referred to as convolutions, this is only by convention. Mathematically, it is technically a sliding dot product or cross-correlation.

When programming a CNN, each convolution layer within a neural network should have the following attributes:
1) (i) Input is a tensor with shape (number of images)×(image width)×(image height)×(image depth);
2) (ii) Convolution kernels whose width and height are hyper-parameters, and whose depth must be equal to that of the image. Convolution layers convolve the input and pass its result to the next layer. This is similar to the response of a neuron in the visual cortex to a specific stimulus.

Performing convolution operations on input data that includes multiple channels and a depth that exceeds one includes serially processing each one of the input data related to each channel and then adding the results of the different channels that relate to each output channel.

This convolution is relatively slow due to the serial nature of the processing, especially when the depth of the input data is relatively limited to be below the number of channels.

In order to speed up the computation of convolutions it is suggested to perform in parallel calculations related to a same depth level but to multiple channels, thereby dramatically improving the throughput of convolution calculations.

Figure 4:
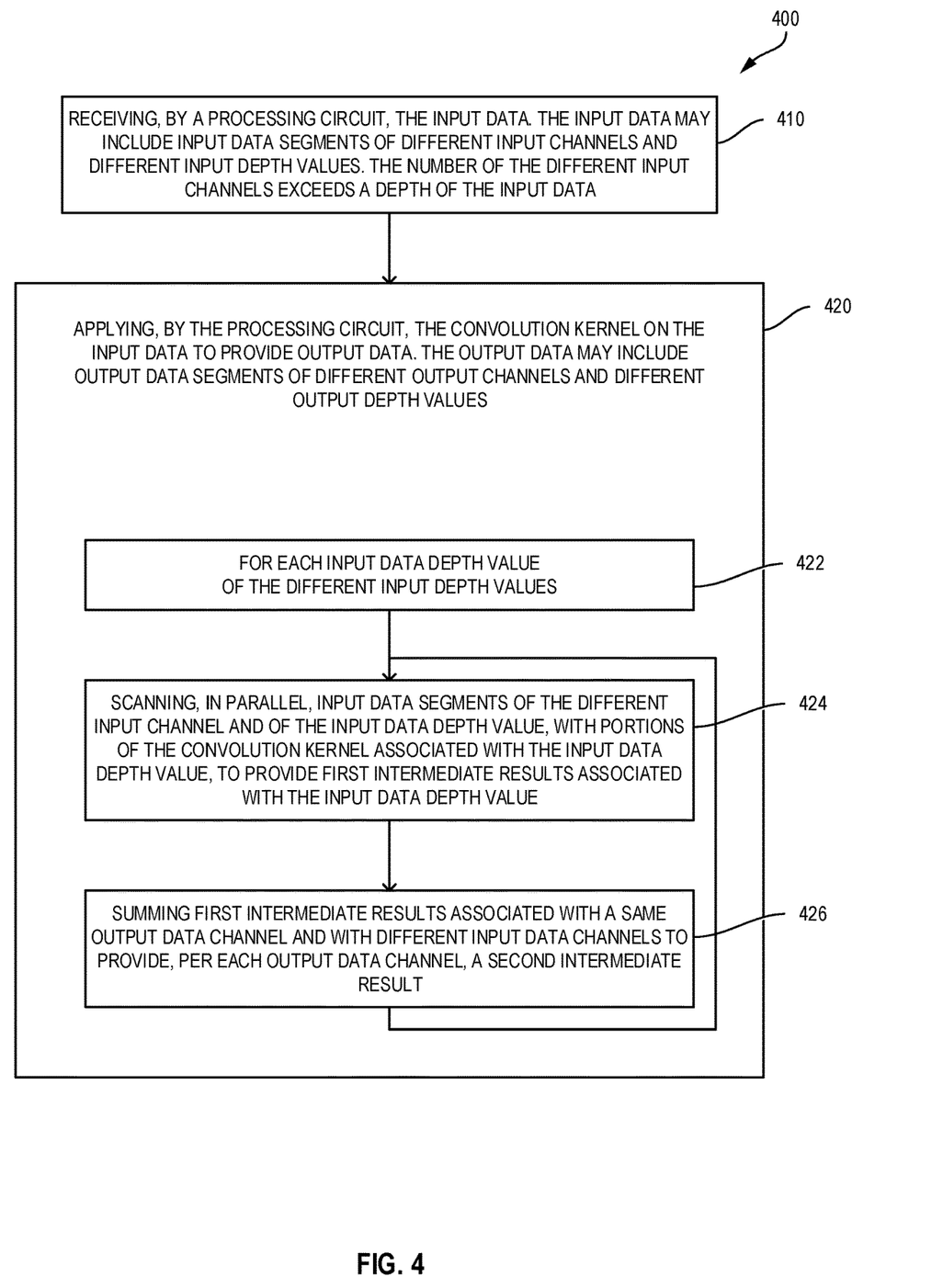
FIG. 4 illustrates an example of a method.

FIG. 4 illustrates a method 400 for applying a convolution kernel on input data.

The input data may include image data, such as image data captured by an image acquisition unit within a vehicle to be used for autonomous driving, semi-autonomous driving, or driver assistance.

Method 400 may start by step 410 of receiving, by a processing circuit, the input data.

The processing circuit may belong (or may be) processing unit 110 of FIGS. 2A-2D. The processing circuit may include one or more field programmable gate arrays (FPGAs), one of more graphical processing units (GPUs), one of more general purpose units, one of more central processing units (CPUs), one or more hardware accelerators, one or more integrated circuits, and the like.

The input data may include input data segments of different input channels and of different input depth values.

The number of input channels exceeds a depth of the input data. The number of the different channels may exceed the depth of the input data by a factor of at least 3, 4, 5, 6, 7, 8, 9, 10, 20, 30, 40, 50, 60, 70, 80, 90, 100, 200, 300, 400, and even more.

Step 410 may be followed by step 420 of applying, by the processing circuit, the convolution kernel on the input data to provide output data.

The output data may include output data segments of different output channels and different output depth values.

The depth of the input data may differ from the depth of the output data.

The depth of the input data may equal the depth of the output data.

The number of channels the input data may differ from the number of channels the output data. For example, it may exceed the number of channels the output data, or may be below the number of channels the output data.

The number of channels of the input data may equal the number of channels the output data.

The depth of the kernel may equal the depth of either one of the input data and the output data.

The depth of the kernel may differ from the depth of either one of the input data and the output data.

Step 420 may include step 422 of repeating steps 424 and 426 for each input data depth value of the different input depth values.

The repetition may include selecting an input data depth value in any manner and then executing steps 424 and 426 for the selected input data depth value.

Step 424 may include scanning, in parallel, input data segments of the different input channels and of the input data depth value, with portions of the convolution kernel associated with the input data depth value, to provide first intermediate results associated with the input data depth value. The scanning includes calculating one dot product after the other.

Step 424 may include scanning an input data segment of a certain input data channel with a certain convolution kernel segment to provide a certain output data segment. Different convolution kernel segments are allocated to different combinations of input data channels and output data channels. For example, assuming that there are Q input data channels (Q is an integer that exceeds two) and that there are R output data channels (R is an integer that exceeds two), then a (rq)'th convolution kernel segment is used for scanning the r'th input data channel to provide the q'th output data channel. It should be noted that (rq) means a combination (for example a concatenation) of indexes r and q (and not a multiplication between index r and index q).

Step 424 may include repetitively applying two dimensional convolution operations between portions of the convolution kernel and the input data. The repetition may include performing an element wise multiplication and adding of elements of a portion of the convolution kernel and a portion of the input data and then performing the element wise multiplication between the portions of the convolution kernel and another portion of the input data.

Step 426 may include summing first intermediate results associated with a same output data channel and with different input depth values to provide, per each output data channel, a second result.

Method 400 may be executed at one or more (for example in multiple different) layers of a convolution neural network.

In this case an input data is a data inputted to a convolution layer and the output data is data outputted from the convolution layer. The output data of one layer may be an input data of yet another layer.

The output data may include analyzed image data, which may include navigation information (e.g., vehicle movement or positioning), object recognition, image segmentation, or other analyzed image data. The output analyzed image data may be used for autonomous driving, semi-autonomous driving, or driver assistance. The output analyzed image data may be used to generate a vehicle control signal, such as automatic control of braking, acceleration, or steering of a vehicle. The output analyzed image data may be used to generate a vehicle control alert, such as a lane departure warning, a navigation deviation warning, a proximity warning, or other vehicle control alert.

Figure 5:
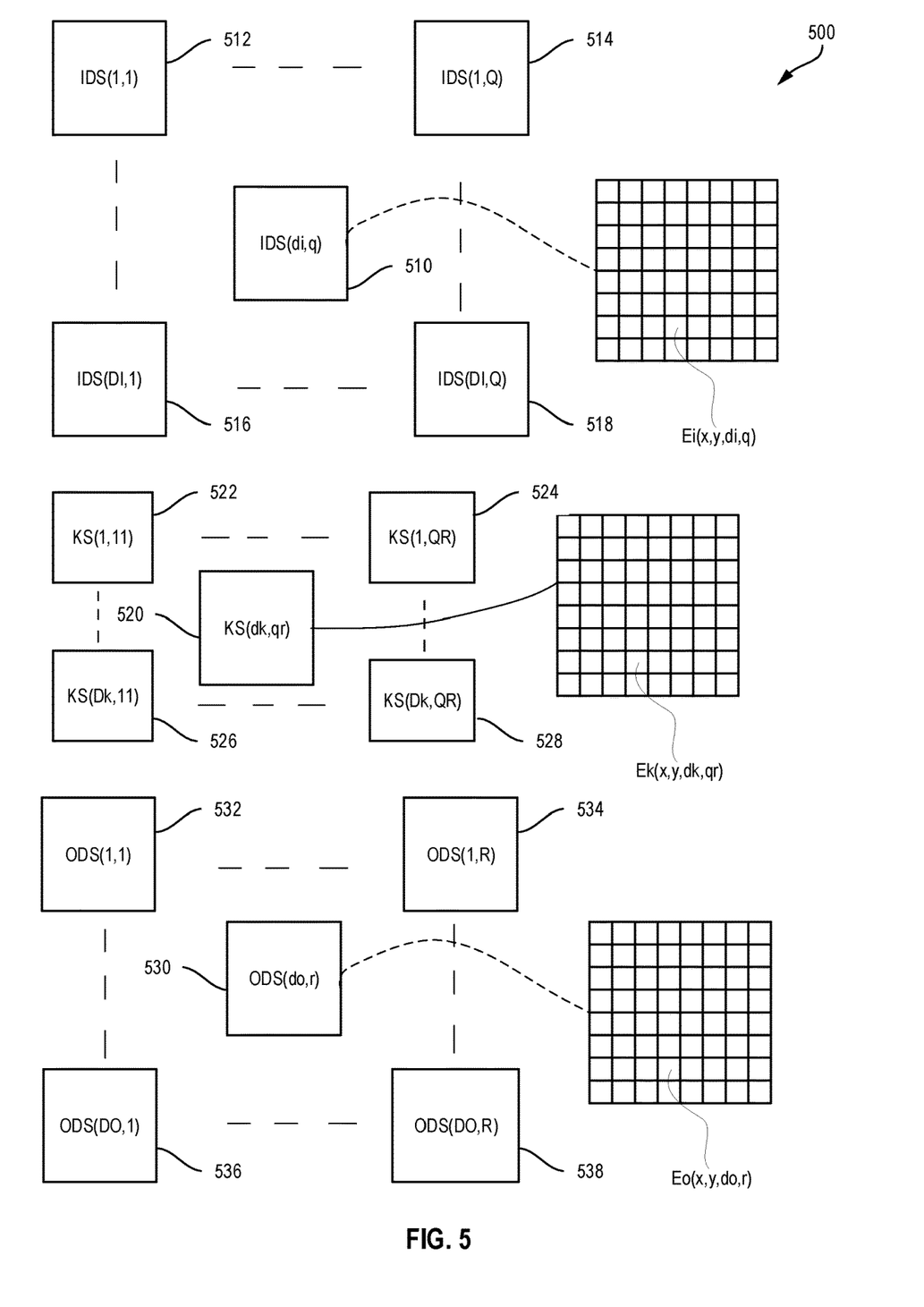
FIG. 5 an example of input data segments, output data segments, and kernel segments.

FIG. 5 is an example of input data segments, output data segments and kernel segments 500. In addition, FIG. 5 illustrates various data structures involved in the execution of the method 400 of FIG. 4.

The input data has a depth of Di and belongs to Q different channels and includes input data segments that range between IDS(1,1) 512 to IDS(Di,Q) 518. The channel of an input data segment is represented by index q (index q ranges between 1 and Q), and the depth of the input data segment is represented by index di (index di ranges between 1 and Di). Q and Di are positive integers that exceed one.

Each input data segment includes multiple elements. An element is represented by its depth, channel, row (index x) and column (index y), as illustrated by input data element Ei(x,y,di,q).

The output data has a depth of Do and R channels and includes output data segments. The data segments range between ODS(1,1) 532 to ODS(Do,R) 538.

A channel of an output data segment is represented by index r (index r ranges between 1 and R), and the depth of the output data segment is represented by index do (index do ranges between 1 and Do).

Each output data segment includes multiple elements, an element is represented by its depth, channel, row (index x) and column (index y), as illustrated by output data element Eo(x,y,do,r).

The kernel has a depth of Dk and Q×R kernel segments that are allocated to different combination of input data channels and output data channels. The kernel includes kernel segments that range between KS(1,1) 522 to KS(D,QR) 528.

A kernel segment of a certain depth (dk, dk ranges between 1 and Dk) is allocated to the combination (denoted qr) of the q'th input data channel and the r'th output data channel.

Each kernel segment includes multiple elements. An element is represented by its depth, combination of input and output data channels, row (index x) and column (index y), as illustrated by kernel element Eo(x,y,dk,qr).

Figure 6:
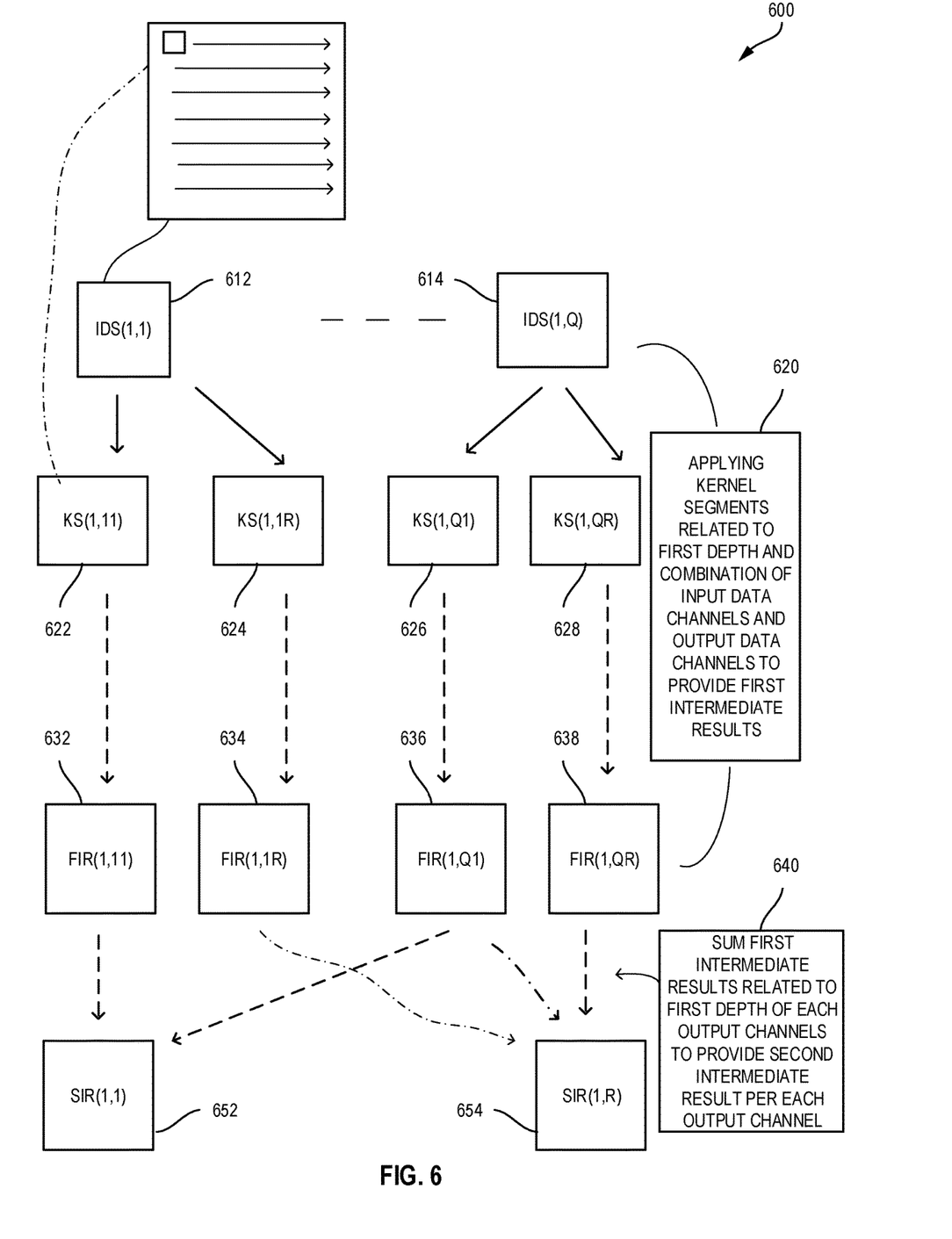
FIG. 6 illustrates various data structures involved in the execution of the method of FIG. 4.

FIG. 6 illustrates processing of input data segments of a certain depth 600. In an example, the depth value may be equal to one.

During step 620, input data segments IDS(1,1) 612 to IDS(1,Q) 614 of first depth and all channels are scanned, in parallel (see for example the scanning of IDS(1,1) 612 with kernel segment KS(1,11) 622) with portions of the convolution kernel (kernel segments) provide first intermediate results associated with the input data depth value.

For simplicity of explanation only the computations related to the first and Q'th input data channels are shown. All other input data channels (for example the second to the (Q-1)'th input data channels) are processed in the same manner.

IDS(1,1) 612 is scanned with kernel segments KS(1,11) 622 to KS(1,1R) 624 to provide first intermediate results FIR(1,11) 632 to FIR(1,1R) 634 that represent different combinations of the first input data channels and the first to R'th output data channels.

IDS(1,Q) 614 is scanned with kernel segments KS(1,Q1) 626 to KS(1,QR) 628 to provide first intermediate results FIR(1,Q1) 636 to FIR(1,QR) 638 that represent different combinations of the Q'th input data channels and the first to R'th output data channels.

In step 640, the first intermediate results associated with a same output data channel and with different input data channels are summed to provide, per each output data channel, a second intermediate result.

For each value of index q between 1 and Q, FIR(1,q1) 636 are summed to provide SIR(1,1) 652, FIR(1,qR) 638 are summed to provide SIR(1,R) 654, and the same applies (although not shown) to any value of r that differs from 1 and R. For instance, FIR(1,11) 632 to FIR(1,qr) 638 are summed to provide SIR(1,r).

The process illustrated in FIG. 6 is executed for each value of first input depth.

The subject matter may also be implemented in a computer program for running on a computer system, at least including code portions for performing steps of a method according to the subject matter when run on a programmable apparatus, such as a computer system or enabling a programmable apparatus to perform functions of a device or system according to the subject matter. The computer program may cause the storage system to allocate disk drives to disk drive groups.

A computer program is a list of instructions such as a particular application program or an operating system. The computer program may for instance include one or more of: a subroutine, a function, a procedure, an object method, an object implementation, an executable application, an applet, a servlet, a source code, an object code, a shared library/dynamic load library or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM;

volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

In the foregoing specification, the subject matter has been described with reference to specific examples of embodiments of the subject matter. It will, however, be evident that various modifications and changes may be made therein without departing from the broader spirit and scope of the subject matter as set forth in the appended claims.

Moreover, the terms "front," "back," "top," "bottom," "over," "under," and the like in the description and in the claims, if any, are used for descriptive purposes and not necessarily for describing permanent relative positions. It is understood that the terms so used are interchangeable under appropriate circumstances such that the embodiments of the subject matter described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

To better illustrate the method and apparatuses disclosed herein, a non-limiting list of example embodiments is provided here.

Example 1 is a system for convolution processing, the system comprising: a memory module configured to receive input data, wherein the input data comprises input data segments of different input channels and of different input depth values; wherein a number of the different input channels exceeds a depth of the input data; and a processing circuit configured to apply a convolution kernel on the input data to provide output data that comprises output data segments of different output channels and different output depth values; wherein an application of the convolution kernel comprises, for each input data depth value of each different input depth values, repeating: scanning, in parallel, input data segments of the different input channels and of the input data depth value, with portions of the convolution kernel associated with the input data depth value, to provide first intermediate results associated with the input data depth value; and summing first intermediate results associated with a same output data channel and with different input depth values to provide, per each output data channel, a second result.

In Example 2, the subject matter of Example 1 includes, an autonomous vehicle navigation system, wherein: the autonomous vehicle navigation system includes the memory module, the processing circuit, and an autonomous vehicle control device; and the autonomous vehicle control device controls an autonomous vehicle based on the output data provided by the application of the convolution kernel by the processing circuit.

In Example 3, the subject matter of Examples 1-2 includes, wherein the application of the convolution kernel further comprises scanning an input data segment of a certain input data channel with a certain convolution kernel segment to provide a certain output data segment, wherein different convolution kernel segments are allocated to different combinations of input data channels and output data channels.

In Example 4, the subject matter of Examples 1-3 includes, wherein the scanning comprises repetitively applying two-dimensional convolution operations between portions of the convolution kernel and the input data.

In Example 5, the subject matter of Examples 1-4 includes, wherein the processing circuit is a neural network accelerator.

In Example 6, the subject matter of Examples 1-5 includes, wherein the number of the different input channels exceeds the depth of the input data by at least a factor of ten.

In Example 7, the subject matter of Examples 1-6 includes, wherein the number of the different input channels exceeds the depth of the input data by at least a factor of one hundred.

In Example 8, the subject matter of Examples 1-7 includes, wherein: the output data is generated at a first convolution layer based on the application of the convolution kernel on the input data; and an output second layer data is generated at a second convolution layer based on the application of a second convolution kernel on the output data.

Example 9 is a method for applying a convolution kernel on input data, the method comprising: receiving an input data by a processing circuit, the input data comprising input data segments of different input channels and of different input depth values, wherein a number of the different input channels exceeds a depth of the input data; and applying, by the processing circuit, a convolution kernel on the input data to provide output data that comprises output data segments of different output channels and different output depth values; wherein the application of the convolution kernel comprises, for each input data depth value of each different input depth values, repeating: scanning, in parallel, input data segments of the different input channels and of the input data depth value, with portions of the convolution kernel associated with the input data depth value, to provide first intermediate results associated with the input data depth value; and summing first intermediate results associated with a same output data channel and with different input depth values to provide, per each output data channel, a second result.

In Example 10, the subject matter of Example 9 includes, providing the output data to an autonomous vehicle navigation system, the autonomous vehicle navigation system including the processing circuit and an autonomous vehicle control device; and controlling the autonomous vehicle based on the output data provided by the application of the convolution kernel by the processing circuit.

In Example 11, the subject matter of Examples 9-10 includes, wherein: the scanning of the input data segments comprises scanning an input data segment of a certain input data channel with a certain convolution kernel segment to provide a certain output data segment; and different convolution kernel segments are allocated to different combinations of input data channels and output data channels.

In Example 12, the subject matter of Examples 9-11 includes, wherein the scanning comprises repetitively applying two-dimensional convolution operations between portions of the convolution kernel and the input data.

In Example 13, the subject matter of Examples 9-12 includes, wherein the processing circuit is a neural network accelerator.

In Example 14, the subject matter of Examples 9-13 includes, wherein the number of the different input channels exceeds the depth of the input data by at least a factor of ten.

In Example 15, the subject matter of Examples 9-14 includes, wherein the number of the different input channels exceeds the depth of the input data by at least a factor of one hundred.

In Example 16, the subject matter of Examples 9-15 includes, wherein: the output data is generated at a first convolution layer based on the application of the convolution kernel on the input data; and an output second layer data is generated at a second convolution layer based on the application of a second convolution kernel on the output data.

Example 17 is at least one non-transitory machine-readable storage medium, comprising a plurality of instructions that, responsive to being executed with processor circuitry of a computer-controlled device, cause the computer-controlled device to: receive input data at a processing circuit, the input data comprising input data segments of different input channels and of different input depth values; wherein a number of the different input channels exceeds a depth of the input data; and apply, by the processing circuit, a convolution kernel on the input data to provide output data that comprises output data segments of different output channels and different output depth values; wherein the application of the convolution kernel comprises, for each input data depth value of each different input depth values, repeating: scanning, in parallel, input data segments of the different input channels and of the input data depth value, with portions of the convolution kernel associated with the input data depth value, to provide first intermediate results associated with the input data depth value; and summing first intermediate results associated with a same output data channel and with different input depth values to provide, per each output data channel, a second result.

In Example 18, the subject matter of Example 17 includes, wherein: the output data is provided to an autonomous vehicle navigation system, the autonomous vehicle navigation system including the processing circuit and an autonomous vehicle control device; and the autonomous vehicle is controlled based on the output data provided by the application of the convolution kernel by the processing circuit.

In Example 19, the subject matter of Examples 17-18 includes, wherein: the scanning comprises scanning an input data segment of a certain input data channel with a certain convolution kernel segment to provide a certain output data segment; and different convolution kernel segments are allocated to different combinations of input data channels and output data channels.

In Example 20, the subject matter of Examples 17-19 includes, wherein the scanning comprises repetitively applying two-dimensional convolution operations between portions of the convolution kernel and the input data.

In Example 21, the subject matter of Examples 17-20 includes, wherein the processing circuit is a neural network accelerator.

In Example 22, the subject matter of Examples 17-21 includes, wherein the number of the different input channels exceeds the depth of the input data by at least a factor of ten.

In Example 23, the subject matter of Examples 17-22 includes, wherein the number of the different input channels exceeds the depth of the input data by at least a factor of one hundred.

In Example 24, the subject matter of Examples 17-23 includes, wherein: the output data is generated at a first convolution layer based on the application of the convolution kernel on the input data; and an output second layer data is generated at a second convolution layer based on the application of a second convolution kernel on the output data.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The illustrated examples may be implemented as circuitry located on a single integrated circuit or within a same device. Alternatively, the examples may be implemented as any number of separate integrated circuits or separate devices interconnected with each other in a suitable manner. The examples, or portions thereof, may implemented as soft or code representations of physical circuitry or of logical representations convertible into physical circuitry, such as in a hardware description language of any appropriate type.

The subject matter is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems."

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to subject matters containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the subject matter have been illustrated and described herein, many modifications, substitutions, changes, and equivalents will now occur to those of ordinary skill in the art. It is, therefore, to be understood that the appended claims are intended to cover all such modifications and changes as fall within the true spirit of the subject matter.

We claim:

1. A system for convolution processing, the system comprising:
   a memory module configured to receive input data, wherein the input data comprises input data segments of different input channels and of different input depth values; wherein a number of the different input channels exceeds a depth of the input data; and
   a processing circuit configured to apply a convolution kernel on the input data to provide output data that comprises output data segments of different output channels and different output depth values;
   wherein an application of the convolution kernel comprises, for each input data depth value of each different input depth values, repeating:
   scanning, in parallel, input data segments of the different input channels and of the input data depth value, with portions of the convolution kernel associated with the input data depth value, to provide first intermediate results associated with the input data depth value;
   scanning an input data segment of a certain input data channel with a certain convolution kernel segment to provide a certain output data segment, wherein different convolution kernel segments are allocated to different combinations of input data channels and output data channels; and
   summing first intermediate results associated with a same output data channel and with different input depth values to provide, per each output data channel, a second result.

2. The system according to claim 1, further including an autonomous vehicle navigation system, wherein:
the autonomous vehicle navigation system includes the memory module, the processing circuit, and an autonomous vehicle control device; and
the autonomous vehicle control device controls an autonomous vehicle based on the output data provided by the application of the convolution kernel by the processing circuit.

3. The system according to claim 1, wherein the scanning comprises repetitively applying two-dimensional convolution operations between portions of the convolution kernel and the input data.

4. The system according to claim 1, wherein the processing circuit is a neural network accelerator.

5. The system according to claim 1, wherein the number of the different input channels exceeds the depth of the input data by at least a factor of ten.

6. The system according to claim 1, wherein the number of the different input channels exceeds the depth of the input data by at least a factor of one hundred.

7. A method for applying a convolution kernel on input data, the method comprising:
receiving an input data by a processing circuit, the input data comprising input data segments of different input channels and of different input depth values, wherein a number of the different input channels exceeds a depth of the input data; and
applying, by the processing circuit, a convolution kernel on the input data to provide output data that comprises output data segments of different output channels and different output depth values;
wherein the application of the convolution kernel comprises, for each input data depth value of each different input depth values, repeating:
scanning, in parallel, input data segments of the different input channels and of the input data depth value, with portions of the convolution kernel associated with the input data depth value, to provide first intermediate results associated with the input data depth value;
scanning an input data segment of a certain input data channel with a certain convolution kernel segment to provide a certain output data segment, wherein different convolution kernel segments are allocated to different combinations of input data channels and output data channels; and
summing first intermediate results associated with a same output data channel and with different input depth values to provide, per each output data channel, a second result.

8. The method according to claim 7, further including:
providing the output data to an autonomous vehicle navigation system, the autonomous vehicle navigation system including the processing circuit and an autonomous vehicle control device; and
controlling the autonomous vehicle based on the output data provided by the application of the convolution kernel by the processing circuit.

9. The method according to claim 7, wherein the scanning comprises repetitively applying two-dimensional convolution operations between portions of the convolution kernel and the input data.

10. The method according to claim 7, wherein the processing circuit is a neural network accelerator.

11. The method according to claim 7, wherein the number of the different input channels exceeds the depth of the input data by at least a factor of ten.

12. The method according to claim 7, wherein the number of the different input channels exceeds the depth of the input data by at least a factor of one hundred.

13. At least one non-transitory machine-readable storage medium, comprising a plurality of instructions that, responsive to being executed with processor circuitry of a computer-controlled device, cause the computer-controlled device to:
receive input data at a processing circuit, the input data comprising input data segments of different input channels and of different input depth values; wherein a number of the different input channels exceeds a depth of the input data; and
apply, by the processing circuit, a convolution kernel on the input data to provide output data that comprises output data segments of different output channels and different output depth values;
wherein the application of the convolution kernel comprises, for each input data depth value of each different input depth values, repeating:
scanning, in parallel, input data segments of the different input channels and of the input data depth value, with portions of the convolution kernel associated with the input data depth value, to provide first intermediate results associated with the input data depth value;
scanning an input data segment of a certain input data channel with a certain convolution kernel segment to provide a certain output data segment, wherein different convolution kernel segments are allocated to different combinations of input data channels and output data channels; and
summing first intermediate results associated with a same output data channel and with different input depth values to provide, per each output data channel, a second result.

14. The non-transitory machine-readable storage medium according to claim 13, wherein the scanning comprises repetitively applying two-dimensional convolution operations between portions of the convolution kernel and the input data.

15. The non-transitory machine-readable storage medium according to claim 13, wherein the processing circuit is a neural network accelerator.

16. The non-transitory machine-readable storage medium according to claim 13, wherein the number of the different input channels exceeds the depth of the input data by at least a factor of ten.

17. The non-transitory machine-readable storage medium according to claim 13, wherein the number of the different input channels exceeds the depth of the input data by at least a factor of one hundred.

* * * * *